Patented Oct. 16, 1928.

1,687,787

UNITED STATES PATENT OFFICE.

FREDERICK J. PILGRIM, OF DETROIT, MICHIGAN.

SOFTENING COMPOUND.

No Drawing. Application filed December 4, 1924, Serial No. 753,930. Renewed August 23, 1928.

This invention relates to a softening compound that may be advantageously used for temporarily softening lacquered surfaces or any surface produced by a coating containing gun cotton, nitro cellulose, banana oil or amylacetate, such surface ordinarily having an outside skin that is more or less indurate and impenetratable by an ordinary abrasive. As an instance of such surface may be mentioned the well known Duco finish for automobile bodies.

My invention, in its broadest aspect, involves a softening compound including an ingredient which will attack and temporarily soften an indurate surface so that an abrasive may have a quick action relative to the surface, and thus permit of the surface being expeditiously and economically rubbed down. The ingredient does not soften the entire coating but momentarily it attacks the skin of the coating so that the abrasive may become effective for rubbing down purposes.

My compound consists of a mixture of water, mineral oil, soap, oil of mirbane or wintergreen, dye and tripoli.

In preparing the compound I prefer to use the ingredients in about the following proportions, viz:

|  | Per cent. |
|---|---|
| Water | 15 |
| Kerosene oil | 30 |
| Ivory soap | 3 |
| Oil of mirbane or wintergreen | 1 |
| Water dye | 1 |
| Tripoli | 50 |

In the above compound the water serves to increase the liquid content of the compound, the kerosene oil as a lubricant, the soap as an emulsifier, the oil of mirbane or wintergreen as a softener, the water dye, preferably blue as a color and the tripoli as an abrasive.

The above ingredients are mixed in the following manner: The kerosene oil is placed in an agitating or mixing machine, the Ivory soap which is preferably pure white, is dissolved in water and then the soapy solution added to the oil in the agitating machine. The oil of mirbane or wintergreen is then placed in the machine along with the dye and the machine operated for approximately thirty minutes or time sufficient to thoroughly mix the tripoli in the admixture.

The compound produced above has the consistency of vaseline and may be readily applied to a surface and rubbed thereon until a desired result is attained. I attach considerable importance to the oil of mirbane or wintergreen since it prepares a way for the abrasive and permits the abrasive to readily attack the surface being rubbed down.

What I claim is:

A softening compound adapted for attacking lacquered or like surfaces consisting 15% of water, 30% of mineral oil, 3% of soap, 1% of oil of mirbane, 1% of dye, and 50% of tripoli.

In testimony whereof I affix my signature.

FREDERICK J. PILGRIM.